(12) United States Patent
Harriman et al.

(10) Patent No.: US 8,055,805 B2
(45) Date of Patent: Nov. 8, 2011

(54) OPPORTUNISTIC IMPROVEMENT OF MMIO REQUEST HANDLING BASED ON TARGET REPORTING OF SPACE REQUIREMENTS

(75) Inventors: David J. Harriman, Portland, OR (US); Andrew F. Glew, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 38 days.

(21) Appl. No.: 12/415,913

(22) Filed: Mar. 31, 2009

(65) Prior Publication Data

US 2010/0250792 A1    Sep. 30, 2010

(51) Int. Cl.
*G06F 3/00* (2006.01)
(52) U.S. Cl. .............. 710/3; 710/2; 710/22; 710/26
(58) Field of Classification Search .......... None
See application file for complete search history.

(56) References Cited

U.S. PATENT DOCUMENTS

| | | | |
|---|---|---|---|
| 5,420,991 A | 5/1995 | Konigsfeld et al. | |
| 5,561,780 A | 10/1996 | Glew et al. | |
| 5,680,565 A | 10/1997 | Glew et al. | |
| 5,751,995 A | 5/1998 | Sarangdhar | |
| 5,751,996 A | 5/1998 | Glew et al. | |
| 5,819,079 A | 10/1998 | Glew et al. | |
| 5,956,753 A | 9/1999 | Glew et al. | |
| 6,009,488 A | 12/1999 | Kaviprapu | |
| 6,035,393 A | 3/2000 | Glew et al. | |
| 6,681,311 B2* | 1/2004 | Gaskins et al. | 711/203 |
| 6,944,617 B2 | 9/2005 | Harriman | |
| 7,099,318 B2 | 8/2006 | Harriman | |
| 7,213,081 B2* | 5/2007 | Narasimhamurthy et al. | 710/2 |
| 7,581,026 B2 | 8/2009 | Harriman et al. | |
| 2003/0005070 A1 | 1/2003 | Narasimhamurthy et al. | |
| 2004/0193757 A1 | 9/2004 | Creta et al. | |
| 2006/0041710 A1* | 2/2006 | Silva et al. | 711/102 |
| 2007/0174587 A1 | 7/2007 | Datta et al. | |

OTHER PUBLICATIONS

Newton, Harry, Newton's Telecom Dictionary, Feb. 2002, CMP books, 18th Edition, p. 682.*
IBM, "An approximation method to estimate MMIO size required for IO devices in a system," Jul. 18, 2006, IP.com, pp. 1-3.*
Boldt et al., "Programmable Processor Bus to MMIO Bus Dirigible Bus Mapping Control," May 1, 1991, IP.com, pp. 1-2.*
International Search Report and Written Opinion Received for PCT Patent Application No. PCT/US2010/26558 mailed on Sep. 28, 2010, 8 pages.

* cited by examiner

*Primary Examiner* — Eron J Sorrell
(74) *Attorney, Agent, or Firm* — Caven & Aghevli LLC (57) ABSTRACT

Methods and apparatus for opportunistic improvement of Memory Mapped Input/Output (MMIO) request handling (e.g., based on target reporting of space requirements) are described. In one embodiment, logic in a processor may detect one or more bits in a message that is to be transmitted from an input/output (I/O) device. The one or more bits may indicate memory mapped I/O (MMIO) information corresponding to one or more attributes of the I/O device. Other embodiments are also disclosed.

30 Claims, 7 Drawing Sheets

OPPORTUNISTIC IMPROVEMENT OF MMIO REQUEST HANDLING BASED ON TARGET REPORTING OF SPACE REQUIREMENTS

FIELD

The present disclosure generally relates to the field of electronics. More particularly, an embodiment of the invention relates to techniques for opportunistic improvement of Memory Mapped Input/Output (MMIO) request handling, e.g., based on target reporting of space requirements.

BACKGROUND

MMIO generally refers to a mechanism for performing input/output operations, e.g., between a processor and peripheral devices in a computer. For example, designated or reserved areas of a memory device that are addressable by a processor (e.g., for read and write operations) may be mapped to select input/output ("I/O" or "IO") device(s). In this fashion, communication between processors and I/O devices may be performed through a memory device.

Some current processor and chipset handling of MMIO access by a processor (for example in memory marked "Uncached" (UC)) may be dictated by legacy compatibility concerns that may generally be much more conservative than is necessary for the majority of implementations. Some attempts have been made to work around this by defining new memory space types such as Write-Combining (WC), but such approaches may be configured by system software, and so may only be used when requiring the implementation of new system software and also when potentially new application software is acceptable. Very often this is not acceptable because of increased costs and time to market, and instead one may need to live with the performance consequences of behaviors that may be almost always needlessly conservative.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments.

Some embodiments relate to efficient techniques to differentiate the request handling requirements for different MMIO spaces. In one embodiment, a device (and/or its associated driver software in an embodiment) may be configured to be aware of and understand the requirements for MMIO accesses to that device. By providing a mechanism for this information to be communicated to the host processor/core/uncore/chipset (which would in turn include logic to detect and process the device specific information), the default request handling behaviors (e.g., associated with the UC memory implementation) may be opportunistically modified. Moreover, legacy devices may remain unaffected, in part, because they retain the default UC request handling characteristics.

More particularly, in one embodiment, new I/O devices may indicate the request handling requirements, for particular memory regions mapped to the respective I/O device, using a message defined for the purpose and/or information included with completion messages for processor initiated requests to that region. This information may be stored or cached by the processor, e.g., in a buffer, a data cache, a dedicated cache, a TLB (Translation Lookaside Buffer), a Bloom filter (e.g., which may be a space-efficient probabilistic data structure that is used to test whether an element is a member of a set), or in some other caching or storage structure appropriate for indicating request handling attributes, such as storage devices discussed herein with reference to FIGS. 2-7. In an embodiment, the cached/stored information may be cleared under pre-defined conditions in an attempt to ensure stale information is not used.

Accordingly, some embodiments provide a capability to improve MMIO performance without requiring system software enabling or system software modification. As a result, some embodiments support the continued use of unmodified legacy hardware and/or software, while allowing new hardware to achieve performance improvements, e.g., as allowed by the host system including a processor.

Figure 1:
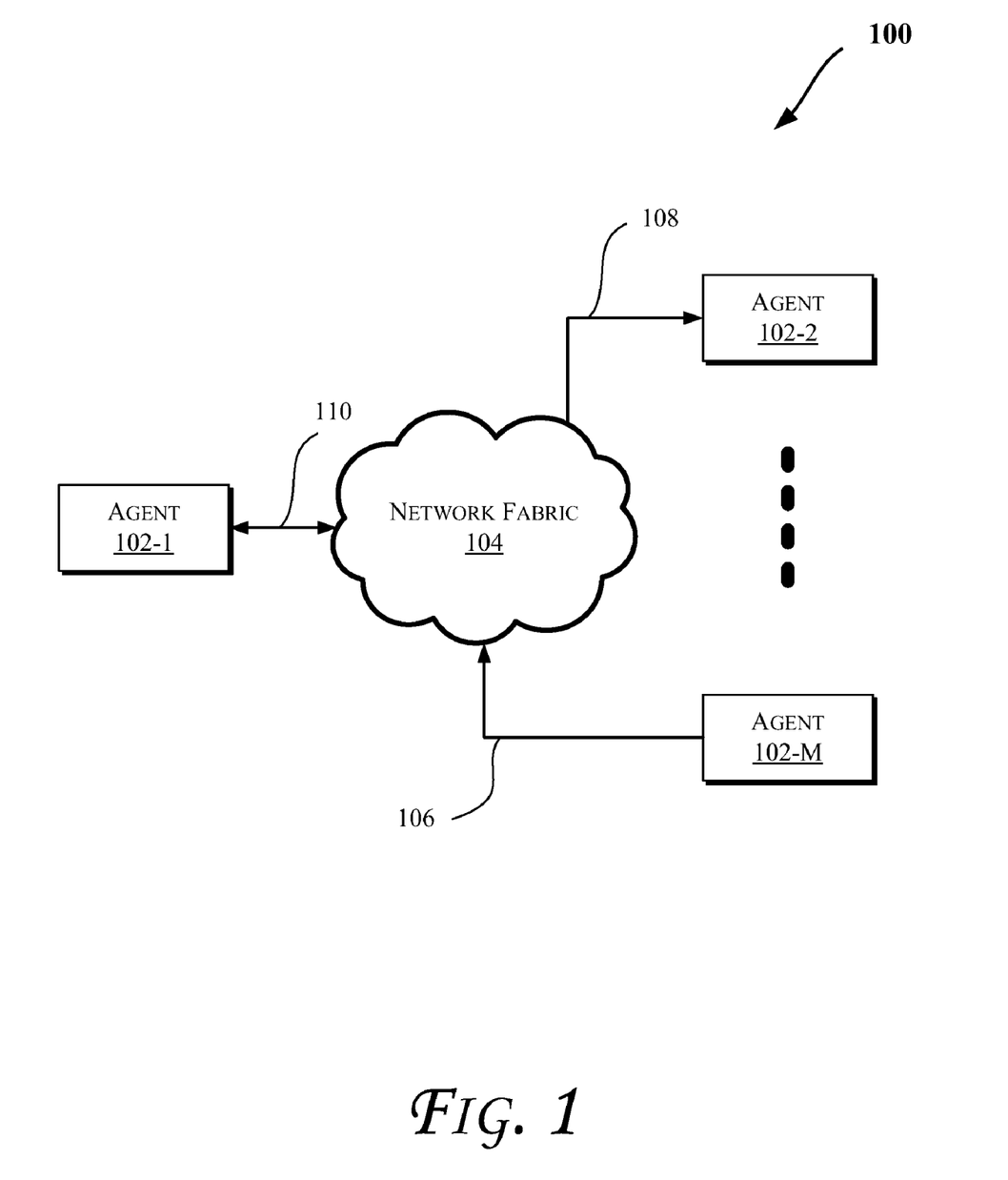
FIGS. 1, 4-5, and 7 illustrate block diagrams of embodiments of computing systems, which may be utilized to implement various embodiments discussed herein.

More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, one or more of the agents 102 may be any of components of a computing system, such as the computing systems discussed with reference to FIGS. 4-5 or 7.

As illustrated in FIG. 1, the agents 102 may communicate via a network fabric 104. In one embodiment, the network fabric 104 may include a computer network that allows various agents (such as computing devices) to communicate data. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point or shared network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

In some situations, the I/O device will know the ordering and data handling requirements (also referred to as "attributes" herein) associated with MMIO regions owned by the I/O device. Current approaches however may require system configuration software to program Memory Type Range Register (MTRR) or page attributes to enable the processor/platform to comprehend these attributes. As a result, this limits use to cases where the appropriate system software infrastructure exists and generally may result in poor scalability.

Alternately, an embodiment provides a mechanism for an I/O device to provide one or more MMIO region attributes (and/or data on ordering and data handling requirements of the I/O device) which would be stored, e.g., in a history buffer, cache, or other storage devices. The default MMIO attributes would match the current UC behavior until a device (e.g., directly or via a interconnecting device such as a switch) indicates deviation is acceptable. This indication could be associated with a completion message for an earlier request, or through a message triggered by an access to a device (which might include an indication requesting such a message, for example because there is no entry corresponding to a MMIO range in a corresponding storage/cache of the processor). This indication could also be associated with a message transmitted autonomously by a device.

A variety of aspects of transaction handling may be modified based on a device's requirements (however, a processor is not required to implement all of these procedures and may only perform a subset in some embodiments). For example, the following attributes could be described:

(1) prefetchable—generally has no read side effects and returns all bytes on reads regardless of the byte enables (e.g., indicating which specific bytes are desired or required to satisfy the memory request), and allows Write Merging (which is further discussed below). For example, memory that is prefetchable has the attribute that it returns the same data when read multiple times and does not alter any other device state when it is read.

(2) write-through type caching—when a memory location is written, the values written are immediately written to memory. Write-through is typically contrasted with write-back, which avoids writing immediately, typically by requiring exclusive ownership of a cache line, writing into the cache line but not to memory. After one or many such writes, the "dirty" line is written to memory.

(3) write type(s) such as combine/collapse/merge writes—combining separate but sequential increasing-address-order memory writes into a single larger transfer; using byte enables to disable unwritten locations is permitted, although this is generally not possible in PCIe (Peripheral Component Interconnect (PCI) express) due to PCIe's byte enable semantics. Merging writes may involve merging separate but sequential masked (byte granularity) memory writes to one DWORD address into a single larger, provided any byte location is written only once. Also, collapsing writes may involve sequential memory writes to the same address being converted into a single transfer, by writing only the most recent data. This is generally not permitted in PCI, although a WC memory type may be used to perform this.

(4) speculative access—MMIO memory locations may have side effects—they may perform operations such as rebooting the system in response to loads. Some microprocessors use "speculative" techniques such as out-of-order execution and branch prediction to improve performance. On such systems the hardware microarchitecture may execute loads (and other operations) speculatively, that the programmer does not intend to execute, or in an order different than specified by the programmer. The hardware ensures that the effects of such operations appear as intended by the programmer, but typically only for ordinary memory, not MMIO. Ordinary memory does not have side effects to loads, speculative or otherwise. MMIO obviously may exhibit bad behavior if speculative loads are performed to MMIO. To this end, in accordance with one embodiment, it is indicated what regions of memory permit speculative loads, and what regions do not.

(5) memory ordering model—some computer processors may implement memory ordering models such as sequential consistency, total store ordering, processor consistency, or weak ordering. In some implementations, weaker memory ordering models allow simpler hardware, but stringer memory ordering models may be assumed by some programmers for parallel applications.

The following figure illustrates how this sort of information could be used to improve the performance of a sequence of processor accesses to an I/O device. More particularly, FIG. 2 illustrates sample code sequence and resulting bus operations for a sample current system versus an embodiment of the invention (which results in performance improvement).

Figure 2:
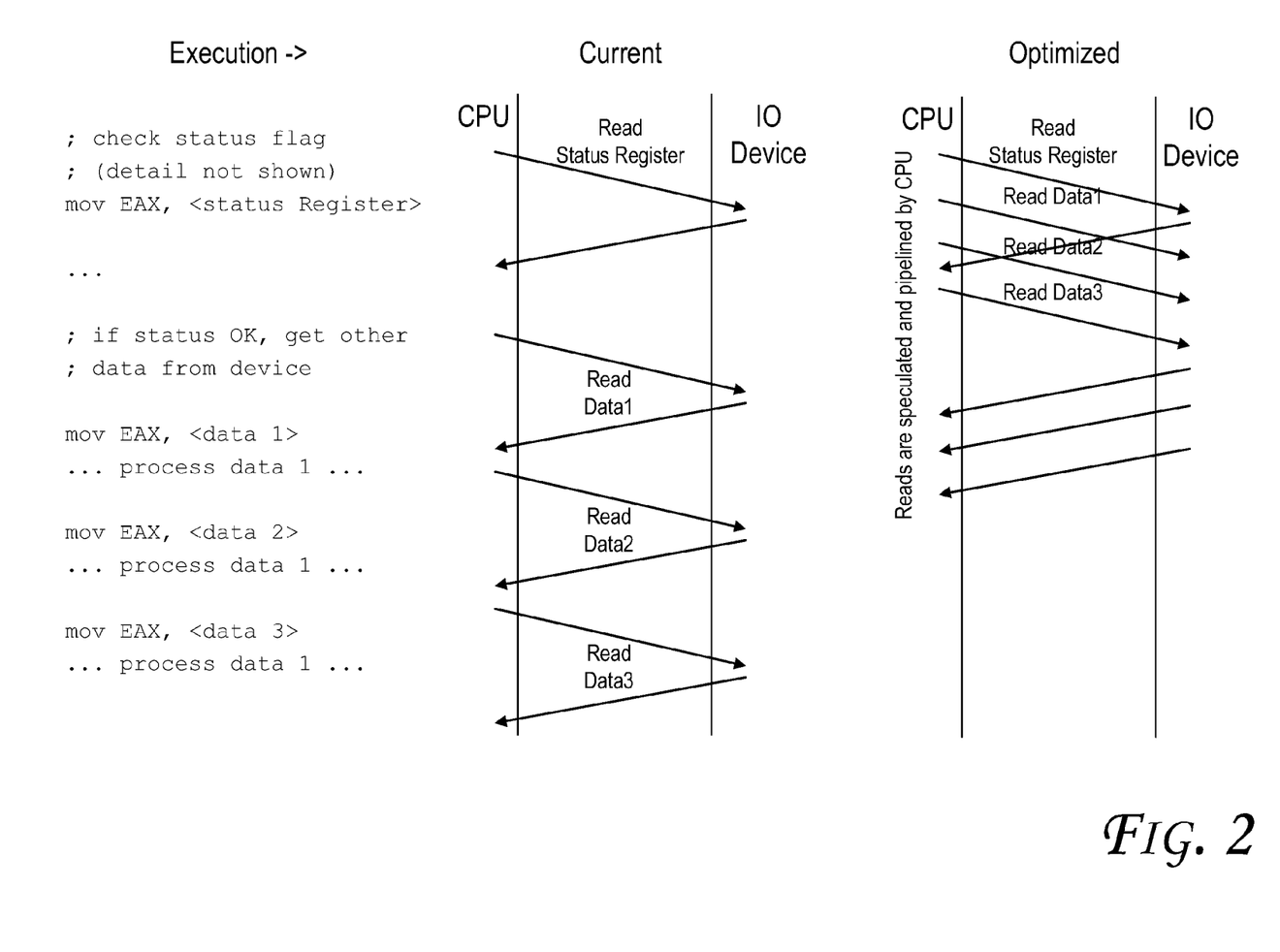
FIG. 2 illustrates a comparison diagram, according to an embodiment.

As shown in FIG. 2, in some current systems, all of the processor reads to the device are serialized—processor operation is stalled waiting for the results from each read before proceeding to the next instruction. In an optimized system (shown on the right side of the figure), the data reads to the device are pipelined speculatively behind the status register read operation. If the status test fails (e.g., the "OK" code is skipped), the results from the data reads will be discarded. In the case where the status read test passes, the data values will be used. Note that in both cases the reads occur in order, so there is no possibility that, for example, the data reads would be reordered ahead of the status reads. However, it might be acceptable that the data reads could be reordered amongst themselves in some embodiments (although this is not shown in the figure).

Furthermore, for the processor/chipset to make this sort of optimization, the I/O device communicates the attributes of the memory space to the processor/chipset in some embodiments. One way of doing this is by including the attribute(s) in each read completion message returned by the I/O device. For a PCIe I/O device, this could be done by replacing the Completer ID field (which may not have an architecturally defined use) with an MMIO Range Attributes field, as shown in FIG. 3.

Figure 3:
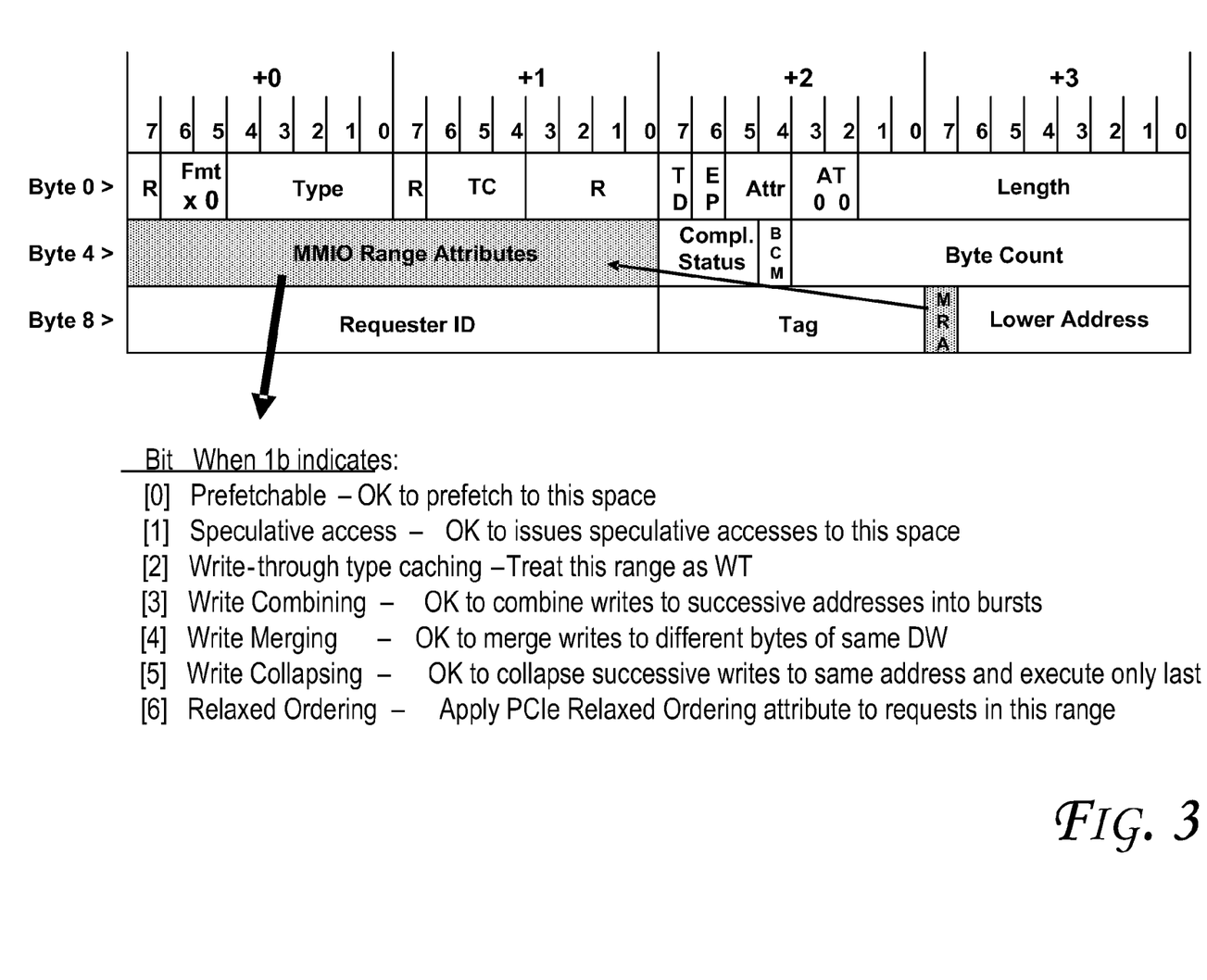
FIG. 3 illustrates header and MMIO range attributes, according to an embodiment.

More particularly, FIG. 3 illustrates Completion Header with MMIO Range Attributes Replacing Completer ID Field, according to an embodiment. The previously reserved MRA (MMIO Range Attributes) bit would indicate a completion message including MMIO Range Attributes. A processor access to an MMIO range (e.g., an aligned 4K region of UC memory) without cached/stored MMIO Attributes would be completed using the default UC handling. When a completion message is returned, indicating MMIO Range Attributes that differ from the default UC attributes, this information would be stored and used to appropriately modify future accesses to the same region.

Alternately (or in addition), a message protocol could be used where, either triggered by an explicit request from the processor or through an implicit request (such as a page access) an I/O device would send a message to the processor/chipset indicating the MMIO Range and associated attributes. In some embodiments, cached entries would be maintained by the processor/chipset until evicted due to cache capacity limitations (e.g., using an LRU (Least Recently Used) algorithm), or due to an explicit or implicit request to invalidate an entry. Any access by a processor to the configuration space of a particular device to change memory range settings (e.g., PCIe BARs (Base Address Registers)) would invalidate cached attribute entries for the corresponding device. As a simplification in some embodiments, one might invalidate these entries when any PCIe configuration accesses is made to a device, or (even more simply) when any PCIe configuration write is performed. Using a message protocol, a device could explicitly request invalidation or updating of page attributes in some embodiments.

Also, a device might want to change the attributes of a given region, for example, when changing from one mode of operation to another, so that it could use the most aggressive or efficient attributes in a mode where such use is acceptable, and change these attributes to less aggressive or more conservative attributes when needed, rather than having to use the more conservative approach of always indicating the less aggressive attributes. This technique might, for example, be used by a graphics card which might apply one set of attributes to on-card memory allocated for use by a graphics application, but apply a different set of attributes when the same on-card memory is reallocated for use by a GP-GPU (Generalized Programming-Graphics Processing Unit) implementation.

As shown in FIG. 3, bits 0 through 6 of Byte 4 may be used to indicated MMIO range attributes. Bit values and corresponding indications are shown in tabular format on the bottom portion of FIG. 3. Depending on the implementation, a set bit or cleared bit may be used to select an option.

Figure 4:
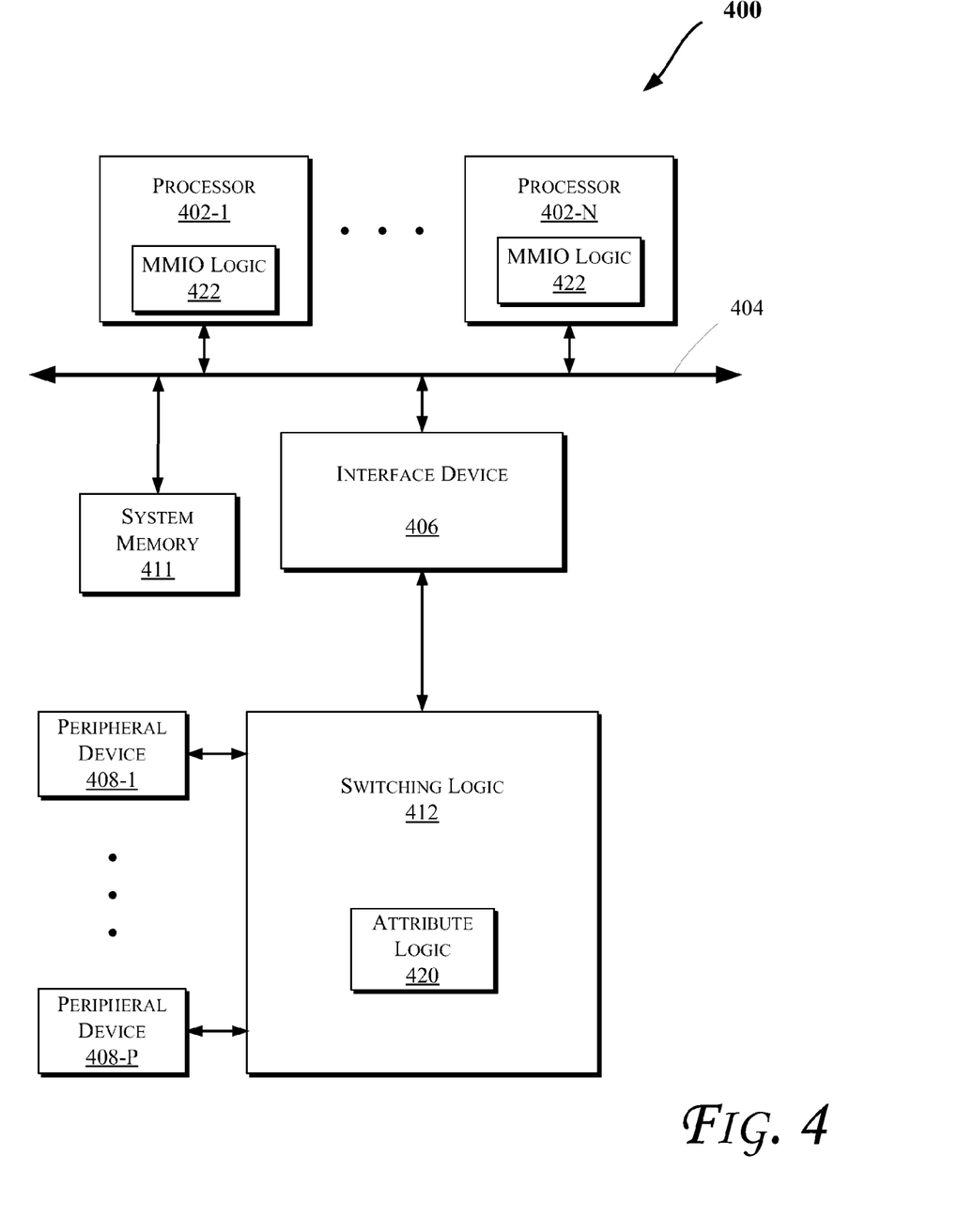

Various types of computing systems may be used to implement the embodiments discussed herein (such as those discussed with reference to FIGS. 2-3). For example, FIG. 4 illustrates a block diagram of portions of a computing system 400, according to an embodiment. In one embodiment, various components of the system 400 may be implemented by one of the agents 102-1 and/or 102-M discussed with reference to FIG. 1. Further details regarding some of the operation of the computing system 400 will be discussed herein with reference to FIG. 6.

The system 400 may include one or more processors 402-1 through 402-N (collectively referred to herein as "processors 402" or more generally "processor 402"). Each of the processors 402-1 through 402-N may include various components, such as private or shared cache(s), execution unit(s), one or more cores, etc. Moreover, the processors 402 may communicate through a bus 404 with other components such as an interface device 406. In an embodiment, the interface device 406 may be a chipset or a memory controller hub (MCH). Moreover, as will be further discussed with reference to FIG. 7, the processors 402 may communicate via a point-to-point (PtP) connection with other components. Additionally, interface device 406 may communicate with one or more peripheral devices 408-1 through 408-P (collectively referred to herein as "peripheral devices 408" or more generally "device 408"). The devices 408 may be a peripheral device that communicates in accordance with the PCIe specification in an embodiment.

As shown in FIG. 4, a switching logic 412 may be coupled between a variety of agents (e.g., peripheral devices 408 and the interface device 406). The switching logic 412 may include a attribute logic 420 to send attribute information (such as those discussed with reference to FIGS. 2-3), e.g., on behalf of one or more of the peripheral device 408, to the interface device 406 (or a chipset such as the chipset 506 of FIG. 5) and/or processor(s) 402. Furthermore, as shown, one or more of the processors 402 may include MMIO logic 422 to receive the information from the attribute logic 420 and/or the peripheral device(s) directly. The processor(s) may include a storage unit (or a cache) to store the attribute/MMIO information. Also, even though logic 420 is shown to be included in switching logic 412, it may be located elsewhere in the system 400, such as the interface device 406.

Figure 5:
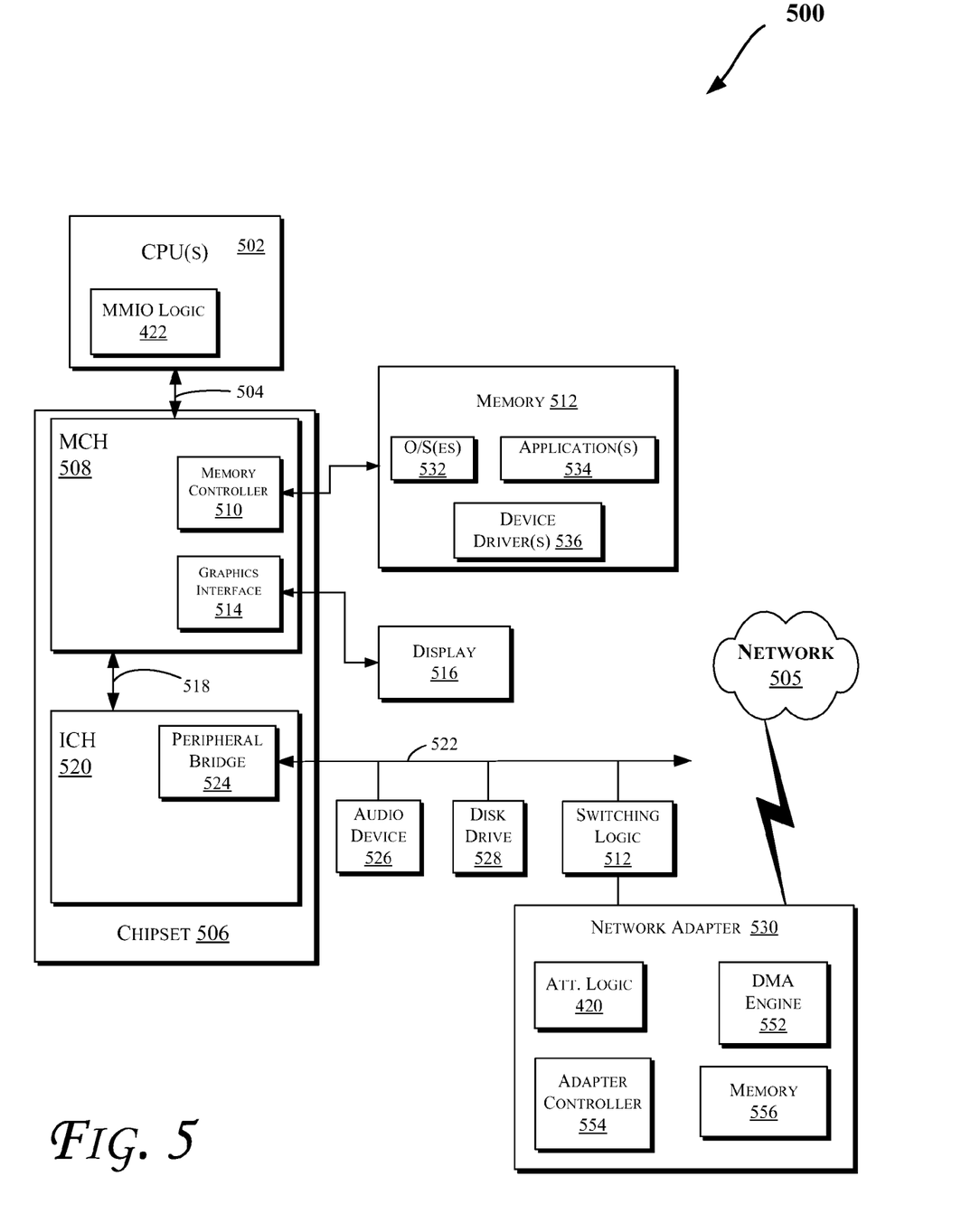

FIG. 5 illustrates a block diagram of an embodiment of a computing system 500. One or more of the agents 102 of FIG. 1 and/or the system 400 of FIG. 4 may comprise one or more components of the computing system 500. The computing system 500 may include one or more central processing unit(s) (CPUs) 502 (which may be collectively referred to herein as "processors 502" or more generically "processor 502") coupled to an interconnection network (or bus) 504. The processors 502 may be any type of processor such as a general purpose processor, a network processor (which may process data communicated over a computer network 505), etc. (including a reduced instruction set computer (RISC) processor or a complex instruction set computer (CISC)). Moreover, the processors 502 may have a single or multiple core design. The processors 502 with a multiple core design may integrate different types of processor cores on the same integrated circuit (IC) die. Also, the processors 502 with a multiple core design may be implemented as symmetrical or asymmetrical multiprocessors.

The processor 502 may include one or more caches (not shown), which may be private and/or shared in various embodiments. Generally, a cache stores data corresponding to original data stored elsewhere or computed earlier. To reduce memory access latency, once data is stored in a cache, future use may be made by accessing a cached copy rather than refetching or recomputing the original data. The cache(s) may be any type of cache, such a level 1 (L1) cache, a level 2 (L2) cache, a level 3 (L3), a mid-level cache, a last level cache (LLC), etc. to store electronic data (e.g., including instructions) that is utilized by one or more components of the system 500.

A chipset 506 may additionally be coupled to the interconnection network 504. In an embodiment, the chipset 506 may be the same as or similar to the interface device 406 of FIG. 4. Further, the chipset 506 may include a memory control hub (MCH) 508. The MCH 508 may include a memory controller 510 that is coupled to a memory 512. The memory 512 may store data, e.g., including sequences of instructions that are executed by the processor 502, or any other device in communication with components of the computing system 500. In an embodiment, the memory 512 may be the same or similar to the memory 411 of FIG. 4. Also, in one embodiment of the invention, the memory 512 may include one or more volatile storage (or memory) devices such as random access memory (RAM), dynamic RAM (DRAM), synchronous DRAM (SDRAM), static RAM (SRAM), etc. Nonvolatile memory may also be utilized such as a hard disk. Additional devices may be coupled to the interconnection network 504, such as multiple processors and/or multiple system memories.

The MCH 508 may further include a graphics interface 514 coupled to a display device 516 (e.g., via a graphics accelerator in an embodiment). In one embodiment, the graphics interface 514 may be coupled to the display device 516 via PCIe. In an embodiment of the invention, the display device 516 (such as a flat panel display) may be coupled to the graphics interface 514 through, for example, a signal converter that translates a digital representation of an image stored in a storage device such as video memory or system memory (e.g., memory 512) into display signals that are interpreted and displayed by the display 516.

As shown in FIG. 5, a hub interface 518 may couple the MCH 508 to an input/output control hub (ICH) 520. The ICH 520 may provide an interface to input/output (I/O) devices coupled to the computing system 500. The ICH 520 may be coupled to a bus 522 through a peripheral bridge (or controller) 524, such as a peripheral component interconnect (PCI) bridge that may be compliant with the PCIe specification, a universal serial bus (USB) controller, etc. The bridge 524 may provide a data path between the processor 502 and peripheral devices. Other types of topologies may be utilized. Also, multiple buses may be coupled to the ICH 520, e.g., through multiple bridges or controllers. For example, the bus 522 may comply with the PCI Local Bus Specification, Revision 3.0, 2004, available from the PCI Special Interest Group, Portland, Oreg., U.S.A. (hereinafter referred to as a "PCI bus"). Alternatively, the bus 522 may comprise a bus that complies with the PCI-X Specification Rev. 3.0a, 2003 (hereinafter referred to as a "PCI-X bus") and/or PCI Express (PCIe) Specifications (PCIe Specification, Revision 2.0, 2006), available from the aforementioned PCI Special Interest Group, Portland, Oreg., U.S.A. Further, the bus 522 may comprise other types and configurations of bus systems. Moreover, other peripherals coupled to the ICH 520 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), etc.

The bus 522 may be coupled to an audio device 526, one or more disk drive(s) 528, and a network adapter 530 (which may be a NIC in an embodiment). In one embodiment, the network adapter 530 or other devices coupled to the bus 522 may communicate with the chipset 506 via the switching logic 512 (which may be the same or similar to the logic 412 of FIG. 4 in some embodiments). Other devices may be coupled to the bus 522. Also, various components (such as the network adapter 530) may be coupled to the MCH 508 in some embodiments of the invention. In addition, the processor 502 and the MCH 508 may be combined to form a single chip. In an embodiment, the memory controller 510 may be provided in one or more of the CPUs 502. Further, in an embodiment, MCH 508 and ICH 520 may be combined into a Peripheral Control Hub (PCH).

Additionally, the computing system 500 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 528), a floppy disk, a compact disk ROM (CD-ROM), a digital versatile disk (DVD), flash memory, a magneto-optical disk, or other types of nonvolatile machine-readable media capable of storing electronic data (e.g., including instructions).

The memory 512 may include one or more of the following in an embodiment: an operating system (O/S) 532, application 534, and/or device driver 536. The memory 512 may also include regions dedicated to MMIO operations. Programs and/or data stored in the memory 512 may be swapped into the disk drive 528 as part of memory management operations. The application(s) 534 may execute (e.g., on the processor(s) 502) to communicate one or more packets with one or more computing devices coupled to the network 505. In an embodiment, a packet may be a sequence of one or more symbols and/or values that may be encoded by one or more electrical signals transmitted from at least one sender to at least on receiver (e.g., over a network such as the network 505). For example, each packet may have a header that includes various information which may be utilized in routing and/or processing the packet, such as a source address, a destination address, packet type, etc. Each packet may also have a payload that includes the raw data (or content) the packet is transferring between various computing devices over a computer network (such as the network 505).

In an embodiment, the application 534 may utilize the O/S 532 to communicate with various components of the system 500, e.g., through the device driver 536. Hence, the device driver 536 may include network adapter (530) specific commands to provide a communication interface between the O/S 532 and the network adapter 530, or other I/O devices coupled to the system 500, e.g., via the chipset 506.

In an embodiment, the O/S 532 may include a network protocol stack. A protocol stack generally refers to a set of procedures or programs that may be executed to process packets sent over a network (505), where the packets may conform to a specified protocol. For example, TCP/IP (Transport Control Protocol/Internet Protocol) packets may be processed using a TCP/IP stack. The device driver 536 may indicate the buffers 538 that are to be processed, e.g., via the protocol stack.

As illustrated in FIG. 5, the network adapter 530 may include the attribute logic 420 (discussed with reference to FIG. 4) which may send attribute information discussed with reference to FIGS. 2-3 to the CPU(s) 502. As with FIG. 4, the CPU(s) may include logic (e.g., logic 422) to receive the attribute information. Also, the CPU(s) may include storage unit(s) (such as a cache, buffer, etc.) to store the attribute information. Also, while logic 420 is included in network adapter 530 in FIG. 5, it may be located elsewhere such as within the switching logic 512, chipset 506, etc.

The network 505 may include any type of computer network. The network adapter 530 may further include a direct memory access (DMA) engine 552, which writes packets to buffers (e.g., stored in the memory 512) assigned to available descriptors (e.g., stored in the memory 512) to transmit and/or receive data over the network 505. Additionally, the network adapter 530 may include a network adapter controller 554, which may include logic (such as one or more programmable processors) to perform adapter related operations. In an embodiment, the adapter controller 554 may be a MAC (media access control) component. The network adapter 530 may further include a memory 556, such as any type of volatile/nonvolatile memory (e.g., including one or more cache(s) and/or other memory types discussed with reference to memory 512). In an embodiment, the memory 556 may store attribute information (such as those discussed with reference to FIGS. 2-3) of the network adapter 530.

Figure 6:
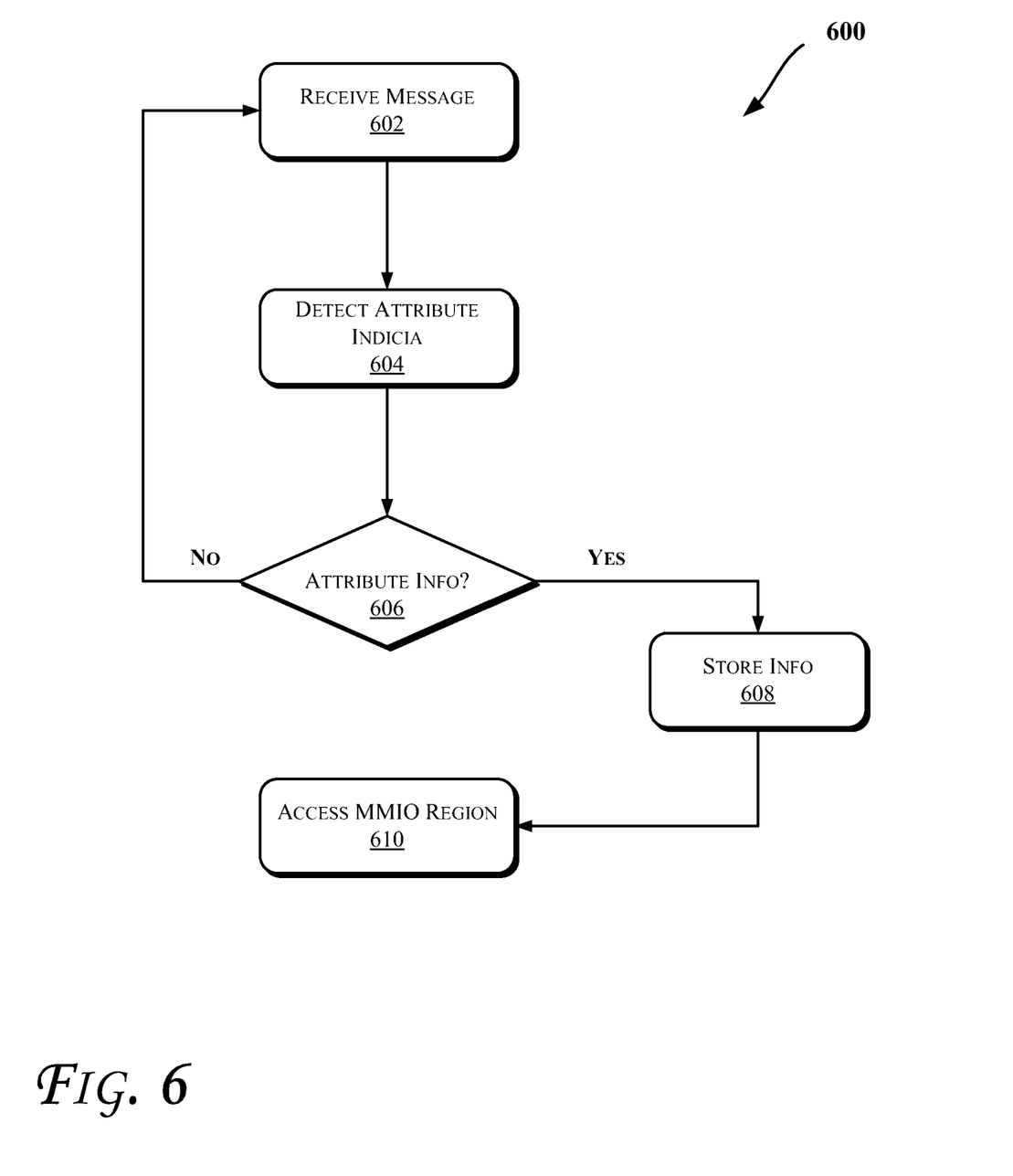
FIG. 6 illustrates a flow diagram of a method according to an embodiment.

FIG. 6 illustrates a flow diagram of a method 600 to access MMIO region(s), according to an embodiment. In one embodiment, various components discussed with reference to FIGS. 1-5 and 7 may be utilized to perform one or more of the operations discussed with reference to FIG. 6.

Referring to FIGS. 1-6, at an operation 602, a message is received (e.g., from logic 420 at logic 422). In some embodiments, the message is generated by an I/O device (or a switch on behalf of the I/O device coupled to the switch) without a query from another component and at the device's own initiation. At an operation 604, attribute indicia (e.g., one or more bits such as those discussed with MMIO attributes of FIG. 3) are detected (e.g., by logic 422). If the attribute indicia is not present, method 600 returns to operation 602 to receive another message; otherwise, the attribute information may be stored 608 (e.g., in a storage device (such as a cache, buffer, table, etc.) of a processor such as those discussed with reference to FIGS. 1-5 or 7). At an operation 610, a MMIO region may be accessed (by processor(s)/core(s) such as those discussed with reference to FIGS. 1-5 or 7), e.g., based on the stored information at operation 608.

Figure 7:
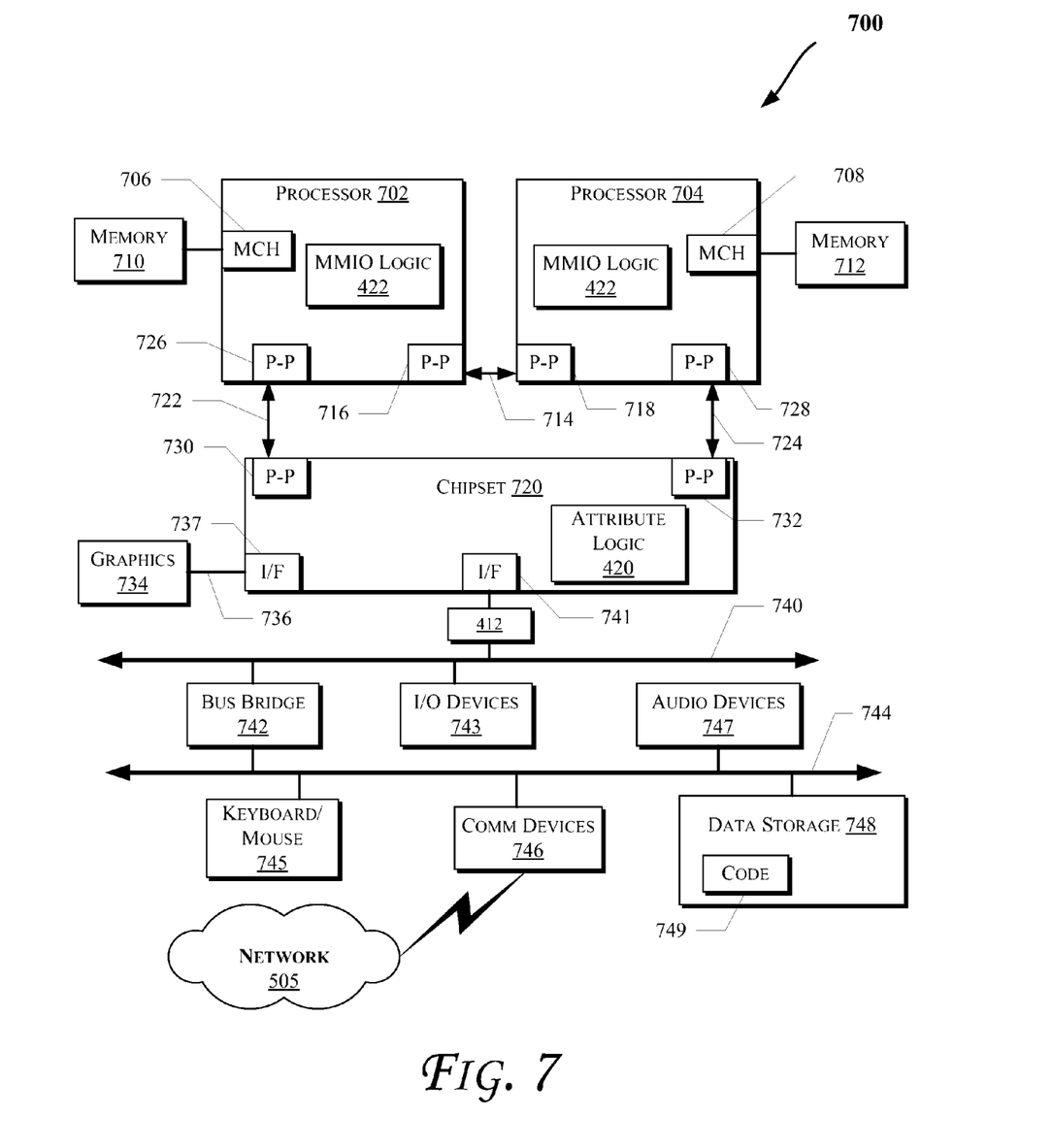

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712 (which may store MMIO regions such as discussed with reference to claims 2-3). The memories 710 and/or 712 may store various data such as those discussed with reference to the memory 512 of FIG. 5. As shown in FIG. 7, the processors 702 and 704 may also include one or more cache(s) such as those discussed with reference to FIGS. 4 and 5.

In an embodiment, the processors 702 and 704 may be one of the processors 502 discussed with reference to FIG. 5. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a high-performance graphics circuit 734 via a high-performance graphics interface 736, e.g., using a PtP interface circuit 737.

In at least one embodiment, the switching logic 412 may be coupled between the chipset 720 and other components of the system 700 such as those communicating via a bus 740. Other embodiments of the invention, however, may exist in other circuits, logic units, or devices within the system 700 of FIG. 7. Furthermore, other embodiments of the invention may be distributed throughout several circuits, logic units, or devices illustrated in FIG. 7. Also, chipset 720 may include the logic 420 (discussed with reference to FIGS. 2-6) and processor(s) 702, 704 may include logic 422 (discussed with reference to FIGS. 2-6). Further, logic 420 may be located elsewhere in system 700, such as within logic 412, communication device (s) 746, etc.

The chipset 720 may communicate with the bus 740 using a PtP interface circuit 741. The bus 740 may have one or more devices that communicate with it, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 505), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., circuitry), software, firmware, microcode, or combinations thereof, which may be provided as a computer program product, e.g., including a machine-readable or computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media may be downloaded as a computer program product, wherein the program may be transferred from a remote computer (e.g., a server) to a requesting computer (e.g., a client) through data signals provided in a carrier wave or other propagation medium via a communication link (e.g., a bus, a modem, or a network connection).

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be acts described. Rather, the specific features and acts are disclosed as sample forms of implementing the claimed subject matter.

The invention claimed is:
1. A processor comprising:
a first logic to detect one or more bits in a message that is to be transmitted from an input/output (I/O) device, wherein the one or more bits are to indicate memory mapped I/O (MMIO) information corresponding to one or more attributes of the I/O device;
a memory to store the MMIO information; and
a processor core to access a MMIO region in the memory based on the MMIO information, wherein the I/O device is to generate the message at its own initiation and not in response to any query from another component.

2. The processor of claim 1, wherein the one or more attributes are to comprise one or more of: a prefetchable attribute, a write-through type caching attribute, a write type attribute, a speculative access attribute, or a memory ordering model attribute.

3. The processor of claim 2, wherein the write type attribute is to comprise one or more of a combine write attribute, a collapse write attribute, or a merge write attribute.

4. The processor of claim 1, wherein the one or more bits are present in a completion message corresponding to a processor initiated request to the MMIO region.

5. The processor of claim 1, wherein the MMIO information is to comprise data on ordering or data handling requirements of the IO device.

6. The processor of claim 1, wherein the one or more bits are to be transmitted by the I/O device in response to a request received at the I/O device.

7. The processor of claim 6, wherein the request is to be generated in response to lack of an entry, corresponding to the MMIO region, in the memory.

8. The processor of claim 1, wherein the memory is to comprise one or more of a data cache, a dedicated cache, a Translation Look-aside Buffer, or a Bloom filter.

9. The processor of claim 1, wherein one or more of the first logic, the memory, and the processor core are on a same integrated circuit die.

10. The processor of claim 1, further comprising a plurality of processor cores to access the MMIO region in the memory that corresponds to the MMIO information.

11. The processor of claim 10, wherein one or more of the first logic, the memory, and one or more of the plurality processor cores are on a same integrated circuit die.

12. The processor of claim 1, wherein the I/O device is to comprise logic to generate the MMIO information.

13. The processor of claim 1, wherein a switching logic is to generate the MMIO information, wherein the switching logic is coupled between the processor and the I/O device.

14. A method comprising:
receiving a message comprising one or more bits from an input/output (I/O) device, wherein the one or more bits are to indicate memory mapped I/O (MMIO) information corresponding to one or more attributes of the I/O device;
storing the MMIO information in a memory; and
accessing a MMIO region in the memory based on the MMIO information, wherein the I/O device is to generate the message at its own initiation and not in response to any query from another component.

15. The method of claim 14, further comprising detecting the one or more bits after receiving the message.

16. The method of claim 14, wherein the one or more attributes are to comprise one or more of: a prefetchable attribute, a write-through type caching attribute, a write type attribute, a speculative access attribute, or a memory ordering model attribute.

17. The method of claim 16, wherein the write type attribute is to comprise one or more of a combine write attribute, a collapse write attribute, or a merge write attribute.

18. The method of claim 14, wherein receiving the message comprises receiving a completion message corresponding to a processor initiated request to the MMIO region.

19. The method of claim 14, further comprising transmitting the one or more bits in response to receiving a request at the I/O device.

20. The method of claim 14, further comprising generating a request for the one or more bits in response to lack of an entry, corresponding to the MMIO region, in the memory.

21. A system comprising:
an input/output (I/O) device;
a processor comprising a first logic to detect one or more bits in a message that is to be received from the I/O device, wherein the one or more bits are to indicate memory mapped I/O (MMIO) information corresponding to one or more attributes of the I/O device;
a memory to store the MMIO information; and
the processor comprising at least one processor core to access a MMIO region in the memory based on the MMIO information, wherein the I/O device is to generate the message at its own initiation and not in response to any query from another component.

22. The system of claim 21, wherein the one or more attributes are to comprise one or more of: a prefetchable attribute, a write-through type caching attribute, a write type attribute, a speculative access attribute, or a memory ordering model attribute.

23. The system of claim 22, wherein the write type attribute is to comprise one or more of a combine write attribute, a collapse write attribute, or a merge write attribute.

24. The system of claim 21, wherein the one or more bits are present in a completion message corresponding to a processor initiated request to the MMIO region.

25. The system of claim 21, wherein the one or more bits are to be transmitted by the I/O device in response to a request received at the I/O device.

26. The system of claim 25, wherein the request is to be generated in response to lack of an entry, corresponding to the MMIO region, in the memory.

27. The system of claim 21, wherein the memory is to comprise one or more of a data cache, a dedicated cache, a Translation Look-aside Buffer, or a Bloom filter.

28. The system of claim 21, wherein one or more of the first logic, the memory, and the processor are on a same integrated circuit die.

29. The system of claim 21, wherein the I/O device is to comprise logic to generate the MMIO information.

30. The system of claim 21, wherein a switching logic is to generate the MMIO information, wherein the switching logic is coupled between the processor and the I/O device.

* * * * *